United States Patent [19]
Tomatis

[11] 4,331,069
[45] May 25, 1982

[54] CURD MAKING AND SEPARATING MACHINE

[76] Inventor: Stefano Tomatis, Via Provinciale 106/a, Frazione San Lorenzo, 12016 Peveragno (Cuneo), Italy

[21] Appl. No.: 140,743

[22] Filed: Apr. 16, 1980

[30] Foreign Application Priority Data

Feb. 26, 1980 [IT] Italy .................. 67291 A/80

[51] Int. Cl.³ .................. A01J 15/04; A01J 25/00
[52] U.S. Cl. .................. 99/456; 99/348; 99/460; 366/185; 366/187; 366/194; 366/325
[58] Field of Search ............ 99/452, 453, 456, 348, 99/371, 373, 409, 460; 366/237–239, 45, 170, 185, 187, 194, 195, 325

[56] References Cited

U.S. PATENT DOCUMENTS

| | | | |
|---|---|---|---|
| 31,925 | 4/1861 | Wilkins | 99/456 |
| 281,053 | 7/1883 | Goetchins | 366/237 |
| 2,133,170 | 10/1938 | Johnson | 366/45 |
| 2,816,371 | 12/1957 | Fischer | 366/170 |
| 4,073,225 | 2/1978 | Lang-Ree | 366/237 |

*Primary Examiner*—Robert W. Jenkins
*Assistant Examiner*—Timothy F. Simone
*Attorney, Agent, or Firm*—Robert B. Frailey

[57] ABSTRACT

A machine for producing curds from milk and separating the curd from the whey, comprising a hollow vat pivotally mounted on a pair of parallel spaced members for rotation about a horizontal axis extending parallel and proximate to one side of a rectangular upper opening in the tank, by means of a pair of hollow stub shafts serving as outlet ports, and actuating means for keeping the vat normally in a horizontal position and rotating it into a position in which the upper opening thereof is in a vertical plane.

4 Claims, 3 Drawing Figures

CURD MAKING AND SEPARATING MACHINE

BACKGROUND OF THE INVENTION

This invention relates to a machine for producing curds and separating the curds from the whey. The whey may then be used for producing cottage cheese in the same machine.

For producing curds for making cheese and similar dairy products, conventionally milk is allowed to curdle in open stationary vats mounted on an elevated pedestal and provided with an outlet aperture near the bottom. When the milk has curdled and the curds have been broken up, the outlet aperture is opened and the whey together with the curds is conducted through a flexible pipe into a collecting vat provided with a retaining net intermediately of its height. Thus the whey passes through the net to the bottom of the vat from where it is removed through a discharge aperture whereas the curds are retained on the net.

However, due to the turbulent flow of the curds mixed with whey from the curdling vat through the flexible pipe, the mixture of whey and curds reaches the collecting vat at a relatively high speed and in a vortex flow. Therefore, the curds tend to break up and a great deal thereof is discharged through the net together with the whey, whereby the yield is reduced. Also the rough treatment to which the curds are thus subjected is harmful to the organoleptic properties thereof.

A further drawback of the conventional mostly circular vats for curdling milk consists in that they have to be supported at a certain height from the ground to permit them to be discharged and have to be surrounded by footboards to enable them to be inspected with the aid of a small movable staircase placed adjacent the footboard. All this involves a considerable amount of expenditure and a cumbersome installation.

SUMMARY OF THE INVENTION

It is therefore an object of the present invention to provide a machine for producing curds and separating the curds from the whey, which machine eliminates the aforementioned drawbacks of the known curdling process and allows the curds to be separated from the whey with greater yield than by the conventional process and to produce curds which are not so much agitated mechanically and therefore have superior organoleptic properties.

A further object of the present invention is to provide a machine of the type described above which is inexpensive and of reduced size.

These and other objects and advantages of the invention, which will appear from the following description, are achieved according to the invention by a curd making and separating machine which comprises an upwardly open vat having a rectangular shape in cross section and a trough-shaped bottom and pivotally mounted on a pair of spaced support members for rotation about a horizontal axis extending adjacent and along one of the longer or longitudinal sides of a rectangular upper opening in the vat, by means of a pair of hollow stub shafts serving as outlet ports, and actuating means for keeping the vat upright with its opening in a substantially horizontal position and for rotating it to whey and curd discharge positions.

DESCRIPTION OF PREFERRED EMBODIMENT

Figure 1:
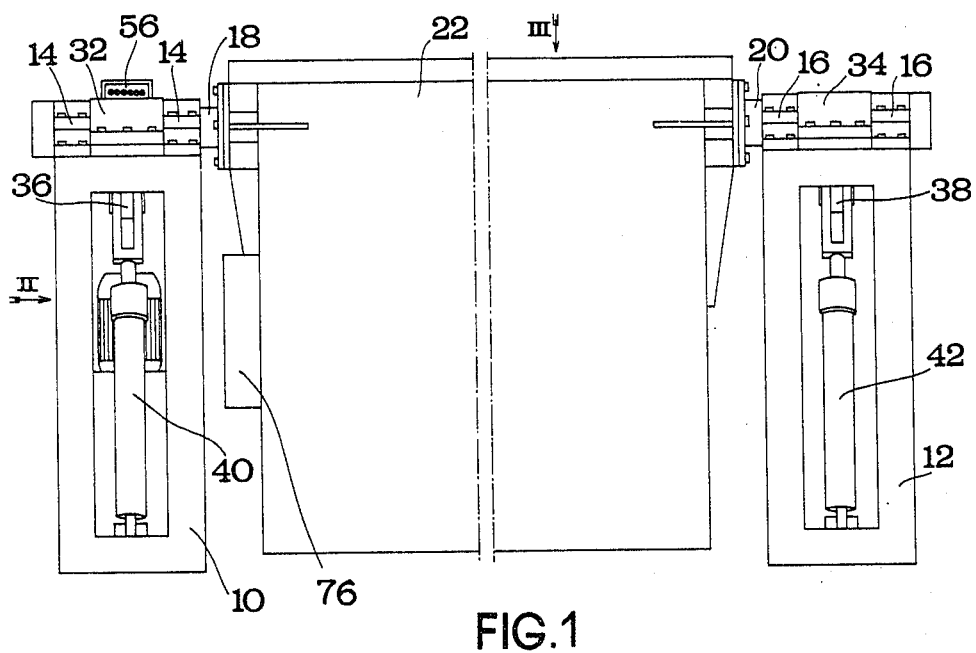
FIG. 1 is a front view of a curd making and separating machine according to the invention.

Referring to the drawings, particularly FIG. 1, a curd making and separating machine according to the invention comprises a pair of spaced cage-like frame members 10 and 12 firmly mounted on the ground and carrying at the top a pair of coaxial rotational bearings 14, 16 which rotatably support a pair of collinear hollow stub shafts 18 and 20 firmly retaining therebetween a hollow vat 22 of rectangular shape in horizontal cross section, having an open top and trough-shaped bottom of semi-cylindrical cross section. The common axis of the stub shafts 18 and 20 is located adjacent one of the upper edges of the tank 22 and extends along one of the longitudinal or larger sides of its rectangular cross-sectional shape. The hollow stub shafts 18 and 20 are secured to the tank 22 by means of flanges 24 and 26 (FIG. 3) bolted to the vat end walls, and the inner cavity of each of the hollow stub shafts communicates with an aperture 28 and 30, respectively, extending through the vat end walls to form a pair of outlet ports near the upper opening of the tank.

Figure 2:
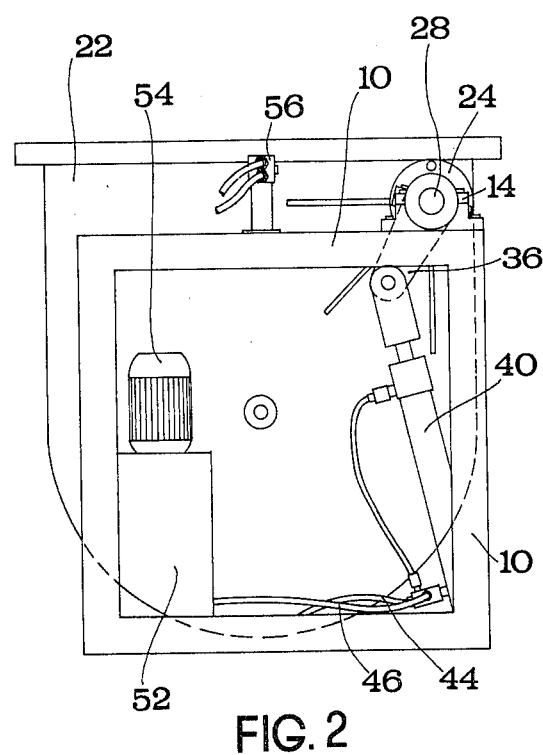
FIG. 2 is an end view of the machine of FIG. 1.

As shown in FIG. 1, a pair of sleeves 32 and 34 is rigidly secured to the stub shafts 18 and 20 and a pair of cranks 36 and 38 extends from and is firmly mounted on the sleeves 32, 34. A pair of double-acting hydraulic rams 40 and 42 extends between the ends of the cranks 36 and 38 and fixed points on the frame members 10 and 12 for keeping the vat normally in a rest or upright position with its upper edges horizontal, as shown in FIGS. 1 and 2, and for rotating the vat, by extension of the rams, about the offset axis of rotation of the stub shafts 18 and 20 through an angle of at least 90° until the upper edge of the vat is in a vertical position or even beyond the vertical position.

The hydraulic rams 40 and 42 are controlled through conduits 44, 46, 48, 50 from a central station comprising a hydraulic pump 52 (FIG. 2) actuated by an electric motor 54 and a distributor 56 (FIG. 3) provided with solenoid valves controlled by an electric control panel (not shown) secured to one of the frame members 10, 12.

Figure 3:
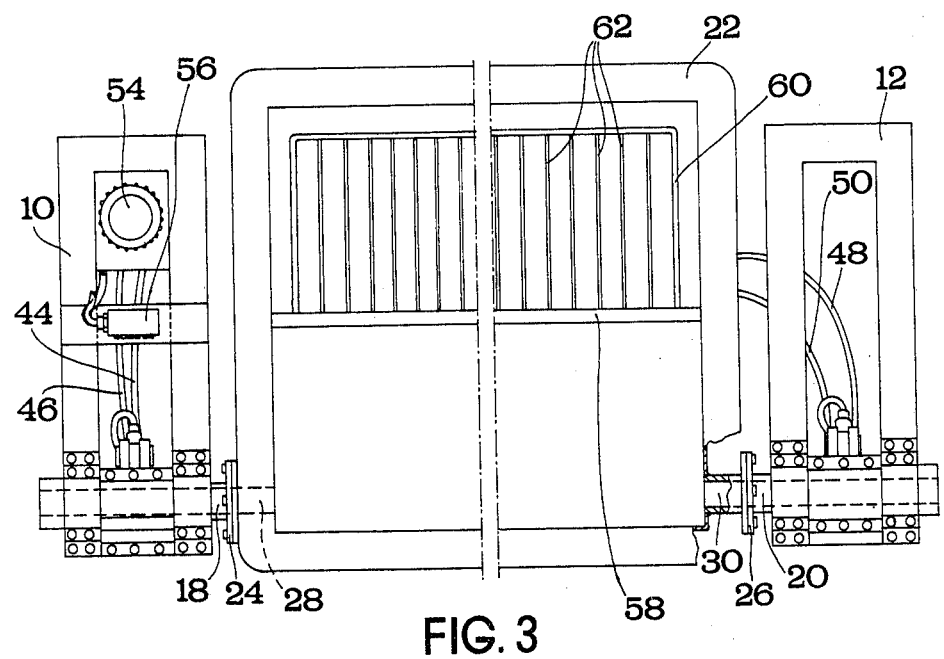
FIG. 3 is a top plan view of the same machine.

As shown in FIG. 3, an internal shaft 58 extends horizontally substantially through the center of the vat 22 and supports an open frame 60 containing a plurality of spaced parallel stretched wires rods or similar elements 62 to form a cutting harp for cutting up the curds into a plurality of separate slices or lumps. The cutting harp, constituted by the generally rectangular frame 60 and the plural spaced curd cutting elements 62, is affixed to, and extends radially from, the rotatable shaft 58. The length of the cutting harp extending along the shaft 58 is slightly shorter than the distance between the two end walls of the vat, and its width is slightly shorter than the internal radius of the semi-cylindrical cross section of the trough-shaped bottom of the vat 22. The shaft 58 is rotatably driven by a hydraulic motor 76 (FIG. 1) provided with reduction gear, the speed of rotation of the shaft being manually controlled as required by means of a flow rate regulator applied to the hydraulic circuit (not shown).

OPERATION OF THE MACHINE

The described machine operates in the following manner: In the rest or upright position shown in the drawings, the vat 22 is filled with milk which is allowed to curdle in the conventional fashion. When the milk has curdled the curds are cut up by means of the harp 60 (FIG. 3). The curds then deposit on the bottom of the vat while the whey floats on top. When the conditions are favorable for separating the curds from the whey, as is determined by one skilled in the art, rotation of the vat is started to discharge the whey through the outlet ports 28 and 30 while the curds remain undisturbed at the bottom of the vat as the latter is being rotated slowly. When the whey has been almost completely discharged through the outlet ports 28 and 30, and substantially only the curds remain in the vat then the outlet ports are closed and the vat is further rotated to dump the curds over the lower longitudinal edge of the rectangular upper opening in the vat into a collecting tray (not shown) placed adjacent the machine.

It will thus be evident that the separation of the curds from the whey is effected without abrupt movements which would upset the curds and thus the collected curds are of superior quality while the discharged whey is cleaner and does not contain so many curd particles as with the conventional process.

The whey obtained in the production of curds from milk is the essential element for the production of cottage cheese. The same machine described above for making and separating curds can also be used for producing cottage cheese. To achieve this, the whey obtained from the curds is poured into the vat at a predetermined temperature and treated in the conventional manner. After formation of cottage cheese from the residual material suspended in the whey, the vat has to be turned over. Before this the whey is removed from the bottom of the vat by connecting a pair of flexible pipes to the outlet ports 28, 30. In this manner the whey can be removed without allowing the cottage cheese to leave the vat through the outlet ports together with the whey.

After this the vat is completely turned over to dump the cottage cheese into truck-mounted trays provided with a dispenser for dosing the cottage cheese.

ADVANTAGES AND SCOPE OF THE INVENTION

It will thus be evident that the rectangular shape and compact construction of the machine will permit a greater yield on the same floor space. Also the machine can be incorporated in partially automated plants as the curds can be dumped into containers placed alongside the machine and supported by transport means such as belt conveyors or the like for moving the curds to subsequent processing stations. Further, the described whey and curds discharging system does not require the vat to be mounted in an elevated position above the ground and therefore no movable staircases are required for inspecting the vat from above as the machine can be so dimensioned that the upper edge of the vat will be at a level below the height of a man.

Although a preferred embodiment of the invention has thus been described by way of example and illustrated in the accompanying drawings it is to be understood that the invention is not limited to this precise embodiment and that numerous changes and modifications may be made therein without departing from the scope of the invention as defined by the appended claims. More particularly, the described hydraulic rams for rotation of the vat may also be replaced by an electric actuator with reduction gear or the like.

I claim:

1. In a curd making and separating machine for producing curds from milk and separating the curds from the whey, said machine having a hollow vat open at the top, the combination comprising:
   (a) a vat having an upper portion of rectangular cross section and a lower portion in the shape of a semi-cylindrical trough, said vat having two spaced, parallel end walls extending from the bottom of the trough to the top of the upper portion of the vat and two spaced, parallel longitudinal walls connected to the end walls and extending tangentially from the trough to the top of the upper portion of the vat, the end walls and longitudinal walls having upper edges defining a rectangular opening for the vat;
   (b) a shaft supported rotatably by the end walls internally of the vat intermediate of the longitudinal walls;
   (c) a curd cutting harp affixed to the internal shaft and comprising a generally rectangular open frame mounting a plurality of spaced curd cutting elements, said harp extending radially from the shaft and having a length along the shaft slightly shorter than the distance between the two end walls and a width slightly shorter than the internal radius of the semi-cylindrical trough;
   (d) drive means mounted externally of the vat for driving said internal shaft;
   (e) two spaced coaxial stub shafts mounted proximate and parallel to one of the longitudinal walls adjacent the rectangular opening of the vat, one stub shaft being affixed to one end wall of the vat and the other stub shaft being affixed to the opposite end wall of the vat, said stub shafts providing an offset axis of rotation for the vat;
   (f) a pair of spaced, external support members for the vat, each said support member being located adjacent one of the end walls and having bearing means for supporting rotatably one of the stub shafts; and
   (g) actuating means mounted on at least one of the support members for actuating said stub shafts to tilt the vat selectively about the offset axis of rotation to a wheying off position, or to a curd dumping position, or to an upright curd producing position wherein the rectangular opening of the vat lies in a substantially horizontal place above the semi-cylindrical trough.

2. The curd making machine of claim 1, wherein at least one of said stub shafts is hollow and its associated end wall is apertured at the axis of said stub shaft to provide discharge means for discharging whey from the vat.

3. The curd making machine of claim 1, wherein said actuating means includes a crank affixed to one of the stub shafts and a hydraulic ram mounted on the support member and connected to said crank.

4. The curd making machine of claim 1, wherein said drive means for driving the internal shaft mounting the curd cutting harp is a hydraulic motor.

* * * * *